United States Patent
Ichikawa

(10) Patent No.: US 9,440,543 B2
(45) Date of Patent: Sep. 13, 2016

(54) VEHICLE AND EXTERNAL POWER FEEDING APPARATUS

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 504 days.

(21) Appl. No.: 13/990,564

(22) PCT Filed: Feb. 15, 2011

(86) PCT No.: PCT/JP2011/053121
§ 371 (c)(1),
(2), (4) Date: May 30, 2013

(87) PCT Pub. No.: WO2012/111088
PCT Pub. Date: Aug. 23, 2012

(65) Prior Publication Data
US 2013/0313913 A1     Nov. 28, 2013

(51) Int. Cl.
*H01F 38/14*     (2006.01)
*B60L 11/18*     (2006.01)
(Continued)

(52) U.S. Cl.
CPC ............ *B60L 11/182* (2013.01); *B60L 11/123* (2013.01); *B60L 11/14* (2013.01); *B60L 11/1824* (2013.01); *B60L 11/1833* (2013.01); *B60L 11/1877* (2013.01); *H01F 38/14* (2013.01); *B60K 1/04* (2013.01); *B60K 2001/0416* (2013.01); *B60L 2210/10* (2013.01); *B60L 2210/30* (2013.01); *B60L 2210/40* (2013.01); *Y02T 10/6217* (2013.01); *Y02T 10/7005* (2013.01); *Y02T 10/705* (2013.01); *Y02T 10/7072* (2013.01); *Y02T 10/7077* (2013.01); *Y02T 10/7216* (2013.01); *Y02T 10/7241* (2013.01);
(Continued)

(58) Field of Classification Search
CPC ... B60L 11/123; B60L 11/1833; H01F 38/14
See application file for complete search history.

(56) References Cited

U.S. PATENT DOCUMENTS 4,712,067 A * 12/1987 Roschmann ..... G01R 33/34046
                                                                324/318
5,917,983 A *  6/1999 Page ................... G01C 19/722
                                                                356/465
(Continued)

FOREIGN PATENT DOCUMENTS

AU     2006269374 B2     1/2007
AU     2006269374 C1     1/2007
(Continued)

OTHER PUBLICATIONS

Kurs et al; "Wireless Power Transfer via Strongly Coupled Magnetic Resonances;" Science; vol. 317; No. 5834; Jul. 6, 2007; pp. 83-86.

*Primary Examiner* — Thienvu Tran
*Assistant Examiner* — Pinping Sun
(74) *Attorney, Agent, or Firm* — Oliff PLC

(57) ABSTRACT

A vehicle self-resonant coil provided at a vehicle is formed to extend along a circumference of a winding center, centered about the winding center. The distance between the center of the vehicle and an anti-node of the vehicle self-resonant coil that is the area of the anti-node of AC current flowing through the vehicle self-resonant coil when electromagnetic field resonant coupling is established between the vehicle self-resonant coil and the facility self-resonant coil is shorter than the distance between the winding center and the center of the vehicle.

8 Claims, 12 Drawing Sheets

(51) Int. Cl.
  *B60L 11/12* (2006.01)
  *B60L 11/14* (2006.01)
  *B60K 1/04* (2006.01)

(52) U.S. Cl.
  CPC .............. *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | |
|---|---|---|---|
| 7,741,734 B2 | 6/2010 | Joannopoulos et al. | |
| 2007/0222542 A1 | 9/2007 | Joannopoulos et al. | |
| 2008/0061785 A1 | 3/2008 | Soutome et al. | |
| 2008/0278264 A1* | 11/2008 | Karalis ................ | B60L 11/182 333/219 |
| 2009/0015975 A1* | 1/2009 | Schrenk ............... | H01L 29/861 361/56 |
| 2009/0045773 A1* | 2/2009 | Pandya ................ | B60L 5/005 320/108 |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0117596 A1* | 5/2010 | Cook .................. | B60L 11/182 320/108 |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0050164 A1* | 3/2011 | Partovi ................ | H01F 5/003 320/108 |

FOREIGN PATENT DOCUMENTS

| | | | |
|---|---|---|---|
| AU | 2007349874 A2 | 10/2008 | |
| AU | 2010200044 A1 | 1/2010 | |
| CA | 2 615 123 A1 | 1/2007 | |
| CA | 2 682 284 A1 | 10/2008 | |
| CN | 101258658 A | 9/2008 | |
| CN | 101682216 A | 3/2010 | |
| CN | 101860089 A | 10/2010 | |
| EP | 1 902 505 A2 | 3/2008 | |
| EP | 2 130 287 A1 | 12/2009 | |
| EP | 2 196 351 A1 | 6/2010 | |
| IN | 735/DELNP/2008 | 5/2008 | |
| IN | 6195/DELNP/2009 | 7/2010 | |
| JP | A-2003-079597 | 3/2003 | |
| JP | A-2008-067807 | 3/2008 | |
| JP | A-2009-501510 | 1/2009 | |
| JP | 2010-098807 A | 4/2010 | |
| JP | A-2010-073976 | 4/2010 | |
| JP | WO 2010041321 A1 * | 4/2010 | ............. B60L 5/005 |
| JP | WO 2010058477 A1 * | 5/2010 | ............. B60K 6/365 |
| KR | 2008-0031398 A | 4/2008 | |
| KR | 2010-0015954 A | 2/2010 | |
| WO | WO 2007/008646 A2 | 1/2007 | |
| WO | WO 2008/118178 A1 | 10/2008 | |
| WO | WO 2012/105040 A1 | 8/2012 | |

* cited by examiner

VEHICLE AND EXTERNAL POWER FEEDING APPARATUS

TECHNICAL FIELD

The present invention relates to a vehicle and an external power feeding apparatus.

BACKGROUND ART

In recent years, attention is focused on hybrid vehicles and electric vehicles driving a driving wheel using electric power from a battery or the like in consideration of the environment.

Particularly in recent years, wireless charging allowing a battery to be charged in a non-contact manner without having to use a plug is attracting attention in an electrical powered vehicle incorporating the aforementioned battery. Furthermore, various charging schemes are recently proposed for charging in a non-contact manner. Particularly, attention is focused on the technique to transmit electric power in a non-contact manner by utilizing the resonance phenomenon.

For example, the vehicle and power feeding apparatus disclosed in Japanese Patent Laying-Open No. 2010-73976 each include a communication coil. The communication coil mounted on the vehicle includes a resonant coil and a power receiving coil. The communication coil mounted on the power feeding apparatus includes a resonant coil and a power feeding coil. Between the resonant coil mounted on the power feeding apparatus and the resonant coil mounted on the vehicle, electric power is transmitted in a non-contact manner utilizing the resonance phenomenon.

As disclosed in Japanese Patent Laying-Open No. 2003-79597 and Japanese Patent Laying-Open No. 2008-67807, there is known an imaging apparatus such as of magnetic resonance imaging (MRI) producing images of sectional views of the body conventionally taking advantage of nuclear magnetic resonance.

CITATION LIST

Patent Literature

PTL 1: Japanese Patent Laying-Open No. 2010-73976
PTL 2: Japanese Patent Laying-Open No. 2003-79597
PTL 3: Japanese Patent Laying-Open No. 2008-67807

SUMMARY OF INVENTION

Technical Problem

During the non-contact power transmission between a vehicle and power feeding apparatus disclosed in Japanese Patent Laying-Open No. 2010-73976, a high frequency current of high voltage flows through each resonant coil to develop a magnetic field of high intensity around each resonant coil. As a result, a magnetic field of high intensity may leak around the vehicle during power transmission depending upon the place where the transmission coil is situated in the vehicle.

In brief, the nuclear magnetic resonance utilized by the imaging device disclosed in Japanese Patent Laying-Open Nos. 2003-79597 and 2008-67807 is a phenomenon in which magnetic application to the hydrogen atoms in water causes resonance to generate a signal. Since the amount of water (the amount of hydrogen atoms) differs depending upon the part of the body and organs, MRI causes magnetic exposure on the human body to appropriately receive signals generated by the nuclear magnetic resonance phenomenon, and produces a cross-sectional image of the body based on the received signals.

Thus, the nuclear magnetic resonance phenomenon utilized in MRI and the electromagnetic field resonant coupling utilized between a vehicle and a power feeding apparatus are based on a completely different phenomenon and their structure differ completely from each other.

The present invention is focused on the problem that, when electric power is transferred in a non-contact manner between a vehicle and an external power feeding apparatus, there is a possibility of a magnetic field of high intensity leaking around the vehicle. An object of the present invention is to provide a vehicle that can suppress leakage of a magnetic field of high intensity around the vehicle when electric power is transmitted based on electromagnetic field resonant coupling between a self-resonant coil provided external to the vehicle and a self-resonant coil mounted on the vehicle. Another object of the present invention is to provide an external power feeding apparatus that can suppress leakage of a magnetic field of high intensity around a vehicle, when electric power is transmitted by electromagnetic field resonant coupling between a self-resonant coil mounted on the vehicle and a self-resonant coil mounted on the external power feeding apparatus.

Solution to Problem

A vehicle according to the present invention includes a vehicle self-resonant coil establishing electromagnetic field resonant coupling with a facility self-resonant coil provided external to the vehicle, allowing reception of electric power from the facility self-resonant coil. The vehicle self-resonant coil is formed to extend along a circumference of a winding center, centered about the winding center. The distance between the center of the vehicle and an anti-node of the vehicle self-resonant coil that is an area of an anti-node of AC current flowing through the vehicle self-resonant coil when electromagnetic field resonant coupling is established between the vehicle self-resonant coil and the facility self-resonant coil is shorter than the distance between the winding center and the center of the vehicle.

Preferably, the anti-node is located at a middle of the vehicle self-resonant coil along a length direction from one end to the other end of a conductor wire constituting the vehicle self-resonant coil. Preferably, the vehicle further includes a capacitor connected to the vehicle self-resonant coil. A resonant circuit is formed by the vehicle self-resonant coil and the capacitor. The anti-node is located at the middle of a current path of the resonant circuit. Preferably, the capacitor is connected at both ends of the vehicle self-resonant coil. The number of windings of the vehicle self-resonant coil is an odd number. The capacitor is arranged at a side opposite to the anti-node relative to the winding center.

Preferably, the capacitor is connected at both ends of the vehicle self-resonant coil. The number of windings of the vehicle self-resonant coil is an even number. The distance between the capacitor and the center of the vehicle is shorter than the distance between the winding center and the center of the vehicle.

Preferably, the vehicle further includes a pair of rear side members aligned in a width direction of the vehicle. When viewing the rear side members and the vehicle self-resonant coil from above, the vehicle self-resonant coil is arranged between the rear side members. Preferably, the anti-node is arranged at a central region along the width direction of the vehicle.

An external power feeding apparatus of the present invention is provided at parking space where a vehicle including a vehicle self-resonant coil parks at a predetermined position. The external power feeding apparatus includes a facility self-resonant coil establishing electromagnetic field resonant coupling with the vehicle self-resonant coil to transmit electric power to the vehicle self-resonant coil. The vehicle self-resonant coil is formed winding about a winding center. The distance between the center of the vehicle and an anti-node of the vehicle self-resonant coil that is the area of the anti-node of AC current flowing through the vehicle self-resonant coil when electromagnetic field resonant coupling is established between the vehicle self-resonant coil and the facility self-resonant coil is shorter than the distance between the winding center and the center of the vehicle. When the vehicle parks at the predetermined position, an anti-node of the facility self-resonant coil that is the area of the anti-node of AC current flowing through the facility self-resonant coil when electromagnetic field resonant coupling is established between the vehicle self-resonant coil and the facility self-resonant coil and the anti-node of the vehicle self-resonant coil are aligned in a height direction.

Advantageous Effects of Invention

According to a vehicle of the present invention, leakage of a magnetic field of high intensity around the vehicle can be suppressed when electric power is received in a non-contact manner from a self-resonant coil provided external to the vehicle. According to an external power feeding apparatus of the present invention, leakage of a magnetic field of high intensity around the vehicle can be suppressed when electric power is transmitted to the vehicle in a non-contact manner.

DESCRIPTION OF EMBODIMENTS

When referring to the number, amount, and the like in the embodiments set forth below, the scope of the present invention is not necessarily limited to the cited number, amount, and the like, unless particularly noted otherwise. Furthermore, each of the constituent elements set forth in the embodiments is not necessarily mandatory, unless particularly noted otherwise. Furthermore, the present invention is directed to a vehicle including a motor generator and a battery, and is applicable to any electrical powered vehicle that can drive a driving wheel using motive power from the motor generator. Therefore, the present invention is applicable to, for example, a hybrid vehicle, an electric vehicle, a fuel cell vehicle, and the like.

First Embodiment

A vehicle and an external power feeding apparatus according to a first embodiment of the present invention will be described based on FIGS. 1-15.

Figure 1:
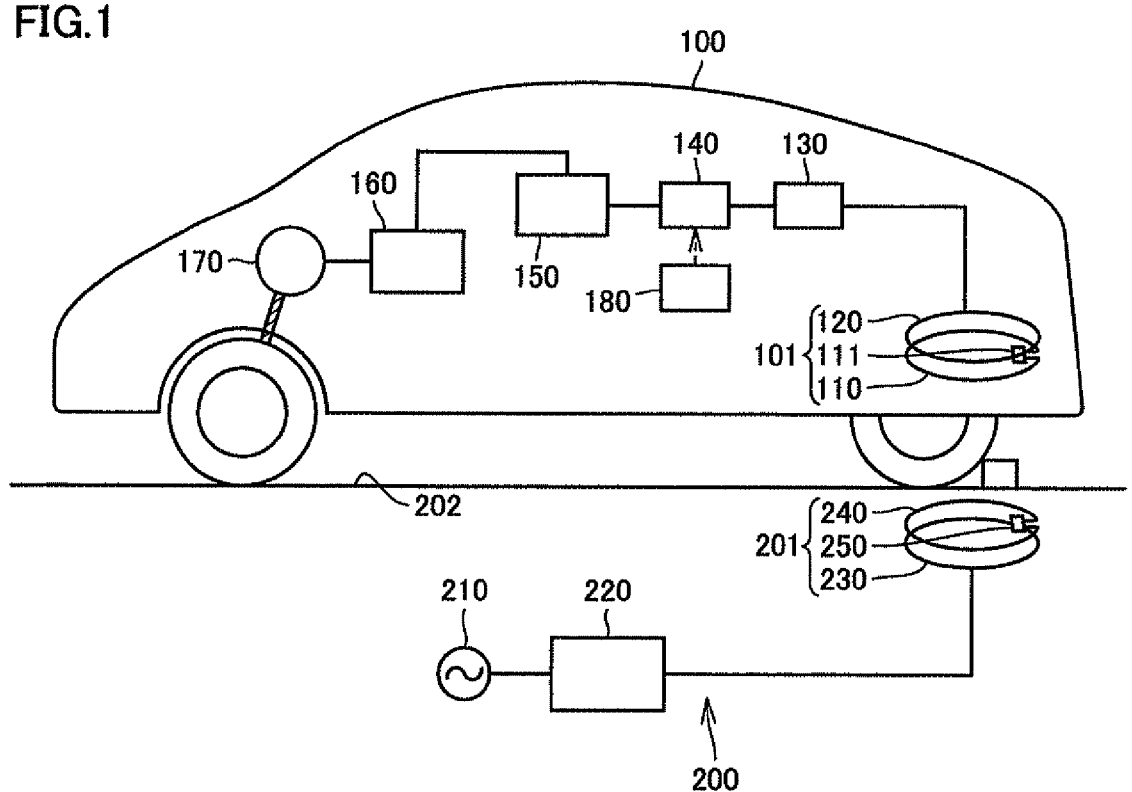
FIG. 1 schematically represents an electrical powered vehicle 100 and an external power feeding apparatus 200 feeding electric power to electrical powered vehicle 100 according to a first embodiment.

FIG. 1 schematically represents an electrical powered vehicle 100, and an external power feeding apparatus 200 feeding electric power to electrical powered vehicle 100 according to the first embodiment.

Electrical powered vehicle 100 parks at a predetermined position in a parking space 202 where external power feeding apparatus 200 is provided to receive electric power mainly from external power feeding apparatus 200. Electrical powered vehicle 100 can supply electric power to external power feeding apparatus 200.

At parking space 202, a wheel block and lines are provided for electrical powered vehicle 100 to park at the predetermined position.

External power feeding apparatus 200 includes a high frequency power driver 220 connected to an AC source 210, and a facility coil unit 201 connected to high frequency power driver 220. Facility coil unit 201 functions mainly as a non-contact power transmission device, and includes a facility self-resonant coil 240, a facility capacitor 250 connected to facility self-resonant coil 240 and a facility electromagnetic induction coil 230 electrically connected to facility self-resonant coil 240.

AC source 210 is a source external to the vehicle such as a system power supply. High frequency power driver 220 converts the electric power received from AC source 210 into electric power of high frequency, and supplies the converted high frequency power to facility electromagnetic induction coil 230. The frequency of the high frequency power generated by high frequency power driver 220 is, for example, 1 MHz to several ten MHz.

Facility electromagnetic induction coil 230 has the aforementioned high frequency power supplied such that the amount of magnetic flux generated from facility electromagnetic induction coil 230 varies over time.

Facility self-resonant coil 240 is coupled in an electromagnetic-induction manner with facility electromagnetic induction coil 230. The change in the amount of magnetic flux from facility self-resonant coil 240 causes a current of high frequency to flow through facility self-resonant coil 240 by electromagnetic induction.

Current is supplied to facility electromagnetic induction coil 230 such that the frequency of the high frequency current flowing through facility self-resonant coil 240 substantially matches the resonant frequency determined by the reluctance of facility electromagnetic induction coil 230 and the capacitance C of facility capacitor 250 connected to facility electromagnetic induction coil 230. Facility self-resonant coil 240 and facility capacitor 250 function as an LC resonator.

Around facility self-resonant coil 240, an electric field and magnetic field of a frequency substantially equal to the relevant resonant frequency are developed. Thus, an electromagnetic field of a predetermined frequency is developed around facility self-resonant coil 240.

Electrical powered vehicle 100 includes an LC resonator having a resonant frequency identical to that of the LC resonator formed by facility self-resonant coil 240 and facility capacitor 250. By the relevant LC resonator and the LC resonator formed by facility self-resonant coil 240 and facility capacitor 250 establishing electromagnetic field resonant coupling, electric power is transmitted from external power feeding apparatus 200 to electrical powered vehicle 100.

Electrical powered vehicle 100 and external power feeding apparatus 200 take advantage of mainly the near field (evanescent field) among the electromagnetic field developed by facility self-resonant coil 240 and facility capacitor 250 to cause supply of electric power from the side of external power feeding apparatus 200 towards electrical powered vehicle 100. Details of the wireless power transmission/reception method utilizing the electromagnetic resonance method will be described afterwards.

Electrical powered vehicle 100 includes a vehicle coil unit 101 mainly functioning as a non-contact power reception device, a rectifier 130 connected to vehicle coil unit 101, a DC/DC converter 140 connected to rectifier 130, a battery 150 connected to DC/DC converter 140, a power control unit (PCU) 160, a motor unit 170 connected to power control unit 160, and a vehicle ECU (Electronic Control Unit) 180 controlling the driving of DC/DC converter 140, power control unit 160, and the like.

Although electrical powered vehicle 100 of the present embodiment is a hybrid vehicle with an engine not shown, any vehicle driven by a motor such as an electric vehicle and fuel cell vehicle is intended to be included.

Vehicle coil unit 101 includes a vehicle self-resonant coil 110, a vehicle capacitor 111 connected to vehicle self-resonant coil 110, and a vehicle electromagnetic induction coil 120 coupled with vehicle self-resonant coil 110 by electromagnetic induction. Details of the configuration of vehicle coil unit 101 will be described afterwards.

Vehicle self-resonant coil 110 and vehicle capacitor 111 constitute an LC resonator. The resonant frequency of the LC resonator formed by vehicle self-resonant coil 110 and vehicle capacitor 111 substantially matches the resonant frequency of the LC resonator formed by facility self-resonant coil 240 and facility capacitor 250.

When a high frequency current having a frequency identical to the resonant frequency of the relevant LC resonator is supplied to facility self-resonant coil 240, an electromagnetic field having a frequency equal to the relevant resonant frequency is developed.

When vehicle self-resonant coil 110 is arranged within a range of approximately several meters, for example, from facility self-resonant coil 240, the LC resonator formed by vehicle self-resonant coil 110 and vehicle capacitor 111 resonates to cause current to flow through vehicle self-resonant coil 110. Thus, vehicle self-resonant coil 110 and facility self-resonant coil 240 establish electromagnetic field resonant coupling.

Vehicle electromagnetic induction coil 120 establishes electromagnetic induction coupling with vehicle self-resonant coil 110 to draw out the electric power received at vehicle self-resonant coil 110. The sequential output of electric power from vehicle self-resonant coil 110 by vehicle electromagnetic induction coil 120 causes electric power to be supplied sequentially from facility self-resonant coil 240 to vehicle self-resonant coil 110 through the electromagnetic field. As such, vehicle coil unit 101 and facility coil unit 201 employ the wireless power transmission/reception method of the so-called electromagnetic resonance scheme.

Rectifier 130 is connected to vehicle electromagnetic induction coil 120 to convert AC current supplied from vehicle electromagnetic induction coil 120 into DC current for supply to DC/DC converter 140.

DC/DC converter 140 adjusts the voltage of the DC current from rectifier 130 and supplies the adjusted DC current to battery 150.

Power control unit 160 includes a converter connected to battery 150, and an inverter connected to this converter. The converter adjusts (boosts) the DC current from battery 150 for supply to the inverter. The inverter converts the DC current from the converter into AC current for supply to motor unit 170.

Motor unit 170 includes, for example, a 3-phase AC motor or the like, and is driven by the AC current supplied from the inverter of power control unit 160.

In the supplying step of the electric power stored in battery 150 to AC source 210, DC/DC converter 140 boosts the current from battery 150, for example, to supply the boosted current to rectifier 130. Rectifier 130 converts the DC current from DC/DC converter 140 into high frequency current. The frequency of the high frequency current is equal to the aforementioned resonant frequency.

Rectifier 130 supplies the high frequency current to vehicle electromagnetic induction coil 120. Vehicle self-resonant coil 110 receives the high frequency current from vehicle electromagnetic induction coil 120 by electromagnetic induction. The frequency of this high frequency current substantially matches the resonant frequency. The LC resonator formed by vehicle self-resonant coil 110 and vehicle capacitor 111 resonates. Then, an electromagnetic field having a frequency equal to the aforementioned resonant frequency is developed around vehicle self-resonant coil 110.

By arranging facility self-resonant coil 240 within the range of approximately several meters, for example, from vehicle self-resonant coil 110, the LC resonator formed by facility self-resonant coil 240 and facility capacitor 250 resonates. The electric power supplied to facility self-resonant coil 240 is drawn out to facility electromagnetic induction coil 230 through electromagnetic induction. The electric power drawn out to facility electromagnetic induction coil 230 passes through high frequency power driver 220 to be supplied to AC source 210.

In the case where electrical powered vehicle 100 is a hybrid vehicle, electrical powered vehicle 100 further includes an engine and a power split mechanism. Motor unit 170 includes a motor generator functioning mainly as a power generator, and a motor generator functioning mainly as an electric motor.

A wireless power transmission/reception scheme based on a resonance method taking advantage of an electromagnetic field is employed between vehicle coil unit 101 and facility coil unit 201 according to the first embodiment, as mentioned above.

Figure 2:
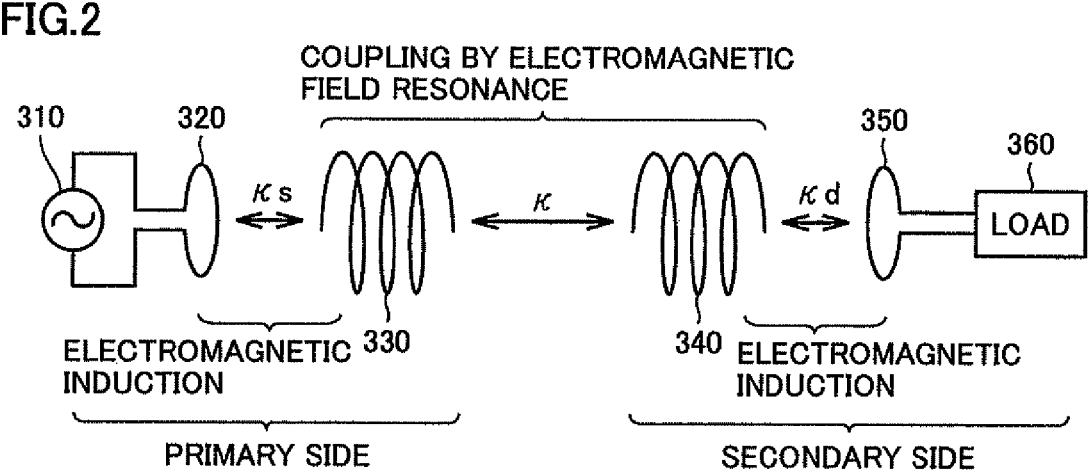
FIG. 2 is a schematic diagram to describe the mechanism of power transmission and power reception by a resonance method.

FIG. 2 is a schematic diagram to describe the mechanism of power transmission and reception by the resonant method. The mechanism of power transmission and power reception by the resonant method will be described based on FIG. 2.

Referring to FIG. 2, the resonance method is similar to the resonance of two tuning forks. By the resonance of two LC resonant coils having the same natural frequency at the electromagnetic field (near field), electric power is transferred from one coil to the other coil via the electromagnetic field.

Specifically, a primary coil 320 is connected to high frequency power source 310, and electric power of a frequency as high as 1 MHz to several ten MHz is supplied to primary self-resonant coil 330 that is magnetically coupled with primary coil 320 by electromagnetic induction. Primary self-resonant coil 330 is an LC resonator based on the coil's inductance and floating capacitance (when a capacitor is connected to the coil, including the capacitance of the capacitor), resonating with a secondary self-resonant coil 340 having the same resonant frequency as primary self-resonant coil 330 via an electromagnetic field (near field). Accordingly, energy (electric power) is transferred from primary self-resonant coil 330 to secondary self-resonant coil 340 via the electromagnetic field. The energy (electric power) transferred to secondary self-resonant coil 340 is extracted by secondary coil 350 magnetically coupled with secondary self-resonant coil 340 through electromagnetic induction to be provided to a load 360. Power transmission by the resonance method is realized when the Q value representing the resonance strength between primary self-resonant coil 330 and secondary self-resonant coil 340 is higher than 100, for example.

As to the corresponding relationship between the configuration of FIG. 2 and the configuration of FIG. 1, AC source 210 and high frequency power driver 220 shown in FIG. 1 correspond to high frequency power source 310 of FIG. 2. Facility electromagnetic induction coil 230 of FIG. 1 corresponds to primary coil 320 of FIG. 2. Further, facility self-resonant coil 240 and facility capacitor 250 of FIG. 1 correspond to primary self-resonant coil 330 of FIG. 3 and the floating capacitance of primary self-resonant coil 330.

Vehicle self-resonant coil 110 and vehicle capacitor 111 of FIG. 1 correspond to secondary self-resonant coil 340 of FIG. 1 and the floating capacitance of secondary self-resonant coil 340.

Vehicle electromagnetic induction coil 120 of FIG. 1 corresponds to secondary coil 350 of FIG. 2. Rectifier 130, DC/DC converter 140 and battery 150 of FIG. 1 correspond to load 360 of FIG. 2.

The wireless power transmission/reception scheme according to the first embodiment aims to improve the power transmission and reception efficiency by utilizing the near field (evanescent field) where "electrostatic field" of the electromagnetic field is dominant.

Figure 3:
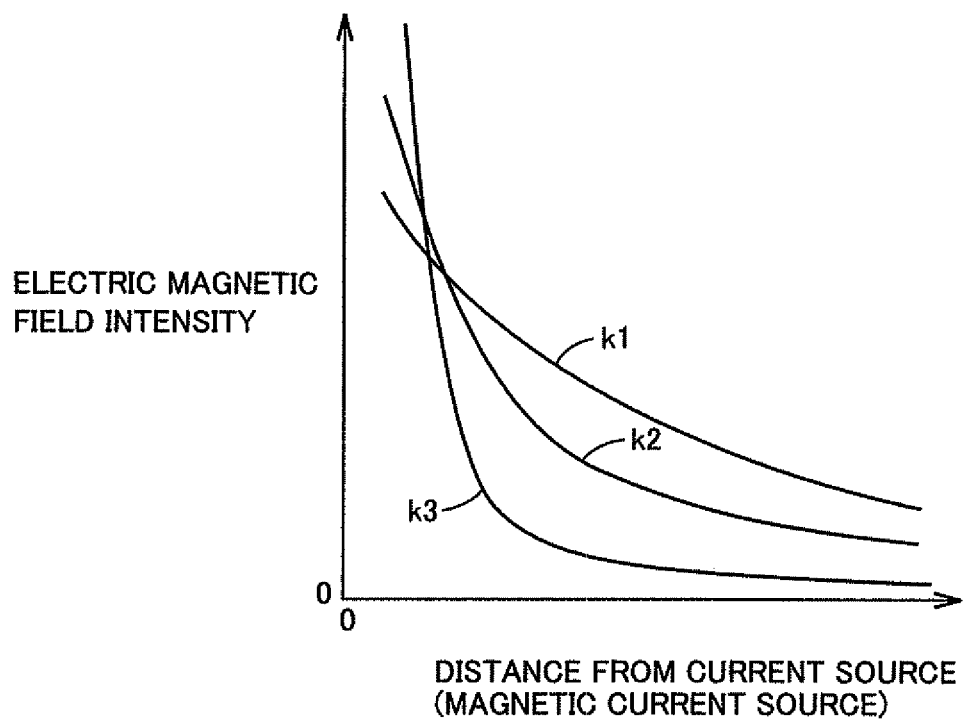
FIG. 3 represents the relationship between the distance from a current source (magnetic current source) and electromagnetic field intensity.

FIG. 3 represents the relationship between the distance from the current source (magnetic current source) and the electromagnetic field intensity. Referring to FIG. 3, the electromagnetic field is composed of three components. Curve k1 represents a component inversely proportional to the distance from the wave source, and is referred to as "radiation electric field". Curve k2 represents a component inversely proportional to the square of the distance from the wave source, and is referred to as "induction electric field". Curve k3 represents a component inversely proportional to the cube of the distance from the wave source, and is referred to as "electrostatic field".

"Electrostatic field" is a region where the intensity of the electromagnetic wave decreases drastically according to the distance from the wave source. In the resonance method, energy (electric power) is transmitted taking advantage of the near field (evanescent field) where this "electrostatic field" is dominant. Specifically, a pair of resonators (for example, a pair of LC resonant coils) having the same natural frequency is caused to resonate in the near field where "electrostatic field" is dominant, whereby energy (electric power) is transferred from one resonator (primary self-resonant coil) to the other resonator (secondary self-resonant coil). Since the "electrostatic field" does not pass on energy far away, the resonance method allows'power to be transmitted with lower energy loss as compared to an electromagnetic wave that transmits energy (electric power) by the "radiation electric field" that passes on energy over a great distance.

Thus, electrical powered vehicle 100 and external power feeding apparatus 200 of the first embodiment take advantage of the resonance at the near field of the electromagnetic field to carry out transmission and reception of electric power between vehicle coil unit 101 of electrical powered vehicle 100 and facility coil unit 201 of external power feeding apparatus 200.

Leakage of a high magnetic field around the vehicle during transmission and reception of electric power between vehicle coil unit 101 and facility coil unit 201 may adversely affect electrical devices around electrical powered vehicle 100.

As a result of diligent study, the inventors of the present application found out that a magnetic field of particularly high intensity is developed at the circumference of a particular portion of vehicle self-resonant coil 110 and a particular portion of facility self-resonant coil 240 during power reception and transmission. The invention of the present application is directed to suppressing leakage of a magnetic field of high intensity around electrical powered vehicle 100 during the process of power reception and power transmission. A specific configuration therefor will be described hereinafter.

Figure 4:
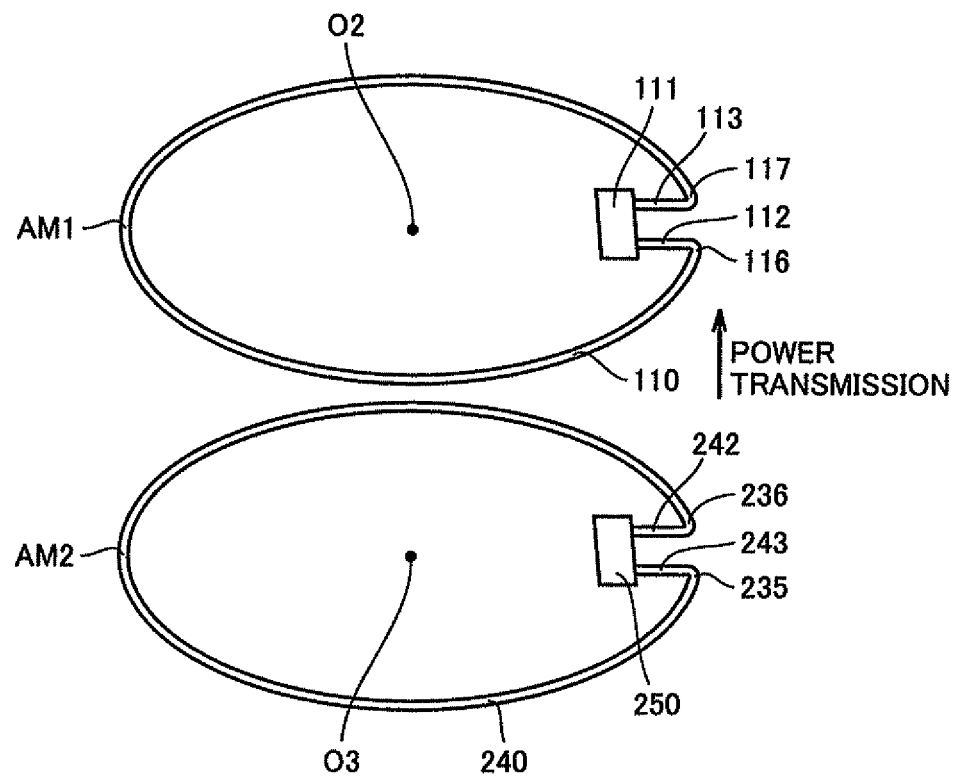
FIG. 4 is a perspective view showing a vehicle capacitor 111 and a vehicle self-resonant coil 110, as well as a facility capacitor 250 and a facility self-resonant coil 240.
Figure 5:
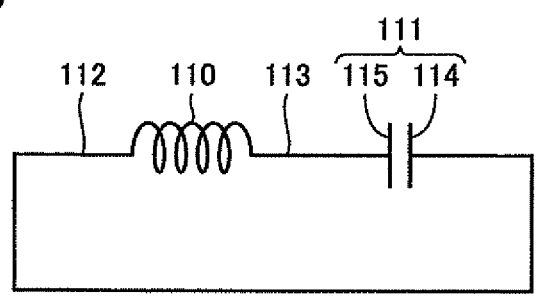
FIG. 5 is a circuit diagram of an LC resonator formed by a vehicle coil unit 101 and vehicle capacitor 111.

FIG. 4 is a perspective view of vehicle capacitor 111 and vehicle self-resonant coil 110, as well as facility capacitor 250 and facility self-resonant coil 240. FIG. 5 is a circuit diagram of an LC resonator formed by vehicle coil unit 101 and vehicle capacitor 111.

As shown in FIG. 4, vehicle self-resonant coil 110 is formed in an arc-shape so as to extend along a circumference of a winding center O2, centered about winding center O2. A connection wiring 112 is provided at an end 116 of vehicle self-resonant coil 110, and a connection wiring 113 is connected at an end 117 of vehicle self-resonant coil 110.

Connection between vehicle self-resonant coil 110 and vehicle capacitor 111 is established by connection wirings 112 and 113.

Facility self-resonant coil 240 is formed in an arc-shape so as to extend along a circumference of a winding center O3, centered about winding center O3. A connection wiring 242 is connected at an end 236 of facility self-resonant coil 240, and a connection wiring 243 is connected at an end 235 of facility self-resonant coil 240. Connection between facility self-resonant coil 240 and facility capacitor 250 is established by connection wirings 242 and 243.

In the example shown in FIG. 4, substantially the same coil is employed for vehicle self-resonant coil 110 and facility self-resonant coil 240.

Referring to FIG. 5, vehicle capacitor 111 includes electrodes 114 and 115 facing each other. Electrodes 114 and 115 are connected to the ends of vehicle self-resonant coil 110 by connection wirings 112 and 113.

When electromagnetic field coupling (electromagnetic resonance) is established between facility self-resonant coil 240 and vehicle self-resonant coil 110, AC current of high frequency flows through a current path formed by vehicle self-resonant coil 110, vehicle capacitor 111 and connection wirings 112, 113. The frequency of this AC current substantially matches the resonant frequency of the LC resonant circuit. The relevant AC current attains a resonating state.

Figure 6:
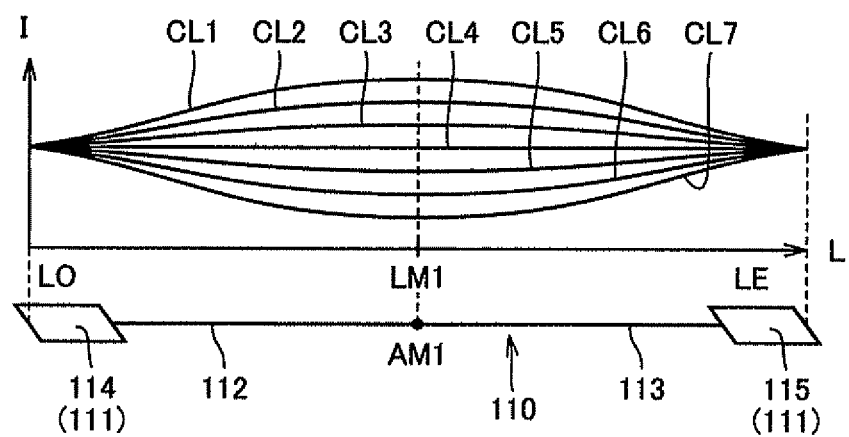
FIG. 6 represents the development of an LC resonator formed by vehicle self-resonant coil 110, vehicle capacitor 111 and connection wirings 112 and 113, and a graph indicating the value of current flowing in the resonant circuit.

FIG. 6 represents the development of an LC resonator formed by vehicle self-resonant coil 110, vehicle capacitor 111 and connection wirings 112 and 113, and a graph indicating the value of current flowing in the resonant circuit.

In FIG. 6, an end of connection wiring 112 is taken as a circuit origin LO of the resonant circuit and an end of electrode 115 is taken as a circuit end LE of the resonant circuit.

In FIG. 6, the vertical axis corresponds to the amount of current and the horizontal axis represents the location of the resonant circuit. Curve CL1 represents the distribution of the current amount at an arbitrary point in time when electromagnetic field resonant coupling is established. Curves CL2-CL7 represent the distribution of the current amount that changes from time to time from the point in time of curve CL1.

As apparent from curves CL1-CL7, the area of a middle position LM1 is the "anti-node" of the current flowing in the resonant circuit. The distance from the connecting position of connection wiring 112 and electrode 114 to circuit origin LO is substantially equal to the distance from the connecting position of electrode 115 and connection wiring 113 to circuit end LE. Furthermore, the length of connection wiring 112 is equal to the length of connection wiring 113. Therefore, middle position LM1 is located at the middle of the conductor wire constituting vehicle self-resonant coil 110 in the length direction. Such a resonant AC current is highest at the area of the "anti-node". The area of vehicle self-resonant coil 110 corresponding to the "anti-node" of the resonant AC current is referred to as anti-node AM1.

Since the current flowing through anti-node AM1 of vehicle self-resonant coil 110 is at the maximum level, a magnetic field of high intensity is developed around anti-node AM1. The intensity of the magnetic field developed around vehicle self-resonant coil 110 becomes smaller as a function of approaching the end side of vehicle self-resonant coil 110.

Since the potential at circuit origin LO and circuit end LE is high whereas the potential at anti-node AM1 is low, the electric field intensity is increased around circuit origin LO and circuit end LE1 whereas the electric field intensity is lowest around anti-node AM1 of vehicle self-resonant coil 110.

Figure 7:
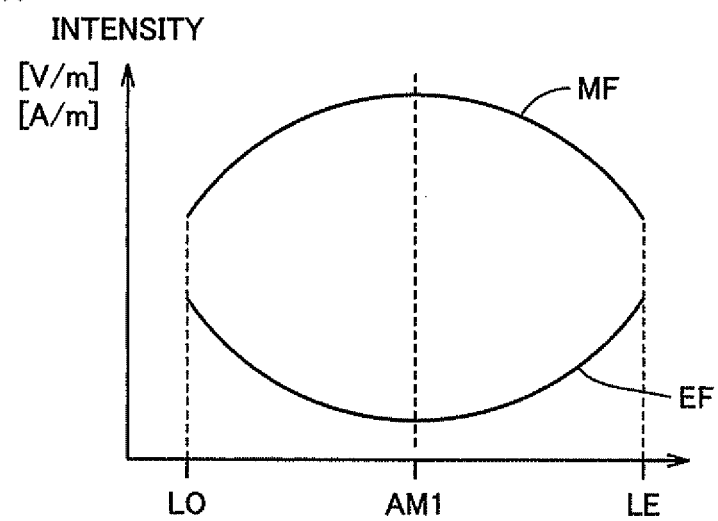
FIG. 7 is a graph representing the location of a resonant circuit and the intensity of an electric field and magnetic field formed around the location.

FIG. 7 is a graph schematically representing the position of the resonant circuit and the intensity of the electric field EF and magnetic field MF developed around the relevant position. It is apparent from FIG. 7 that a magnetic field of high intensity is developed around anti-node AM1 of vehicle self-resonant coil 110.

Although a resonant circuit including vehicle self-resonant coil 110 has been described in FIGS. 6 and 7, a current distribution, a magnetic field intensity distribution, and electric field intensity distribution similar to those of the LC resonant circuit including vehicle self-resonant coil 110 are exhibited in the LC resonant circuit formed by facility self-resonant coil 240, facility capacitor 250, and connection wirings 242 and 243.

In the LC resonant circuit including facility self-resonant coil 240, the area of the "anti-node" of the resonant AC current flowing in this LC resonant circuit is referred to as an anti-node AM2, as shown in FIG. 4.

Figure 8:
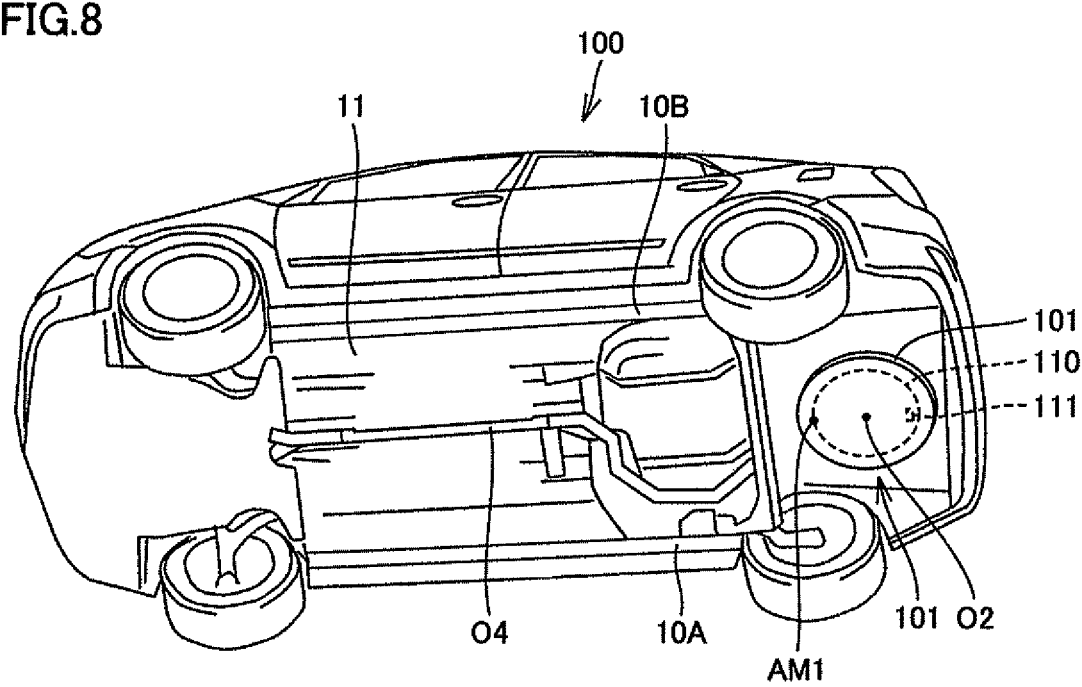
FIG. 8 is a perspective view showing a bottom face of electrical powered vehicle 100.
Figure 9:
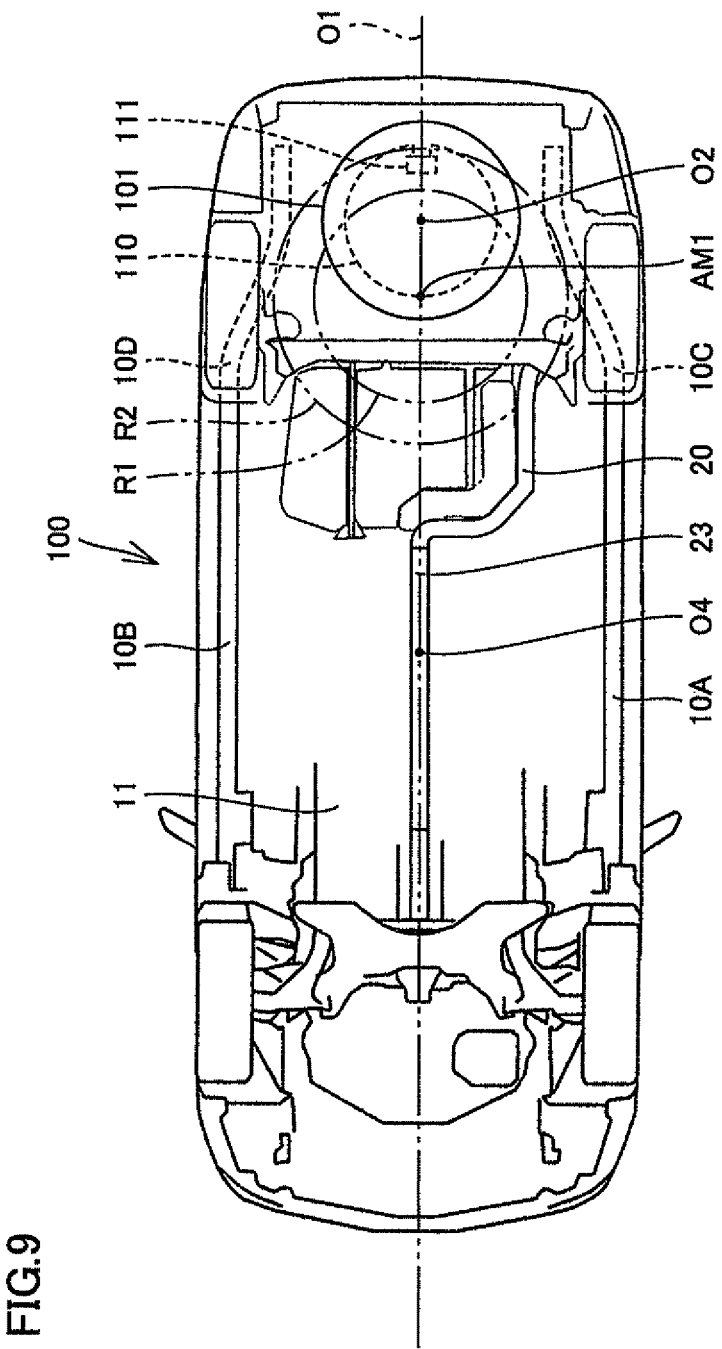
FIG. 9 is a bottom view of electrical powered vehicle 100.
Figure 10:
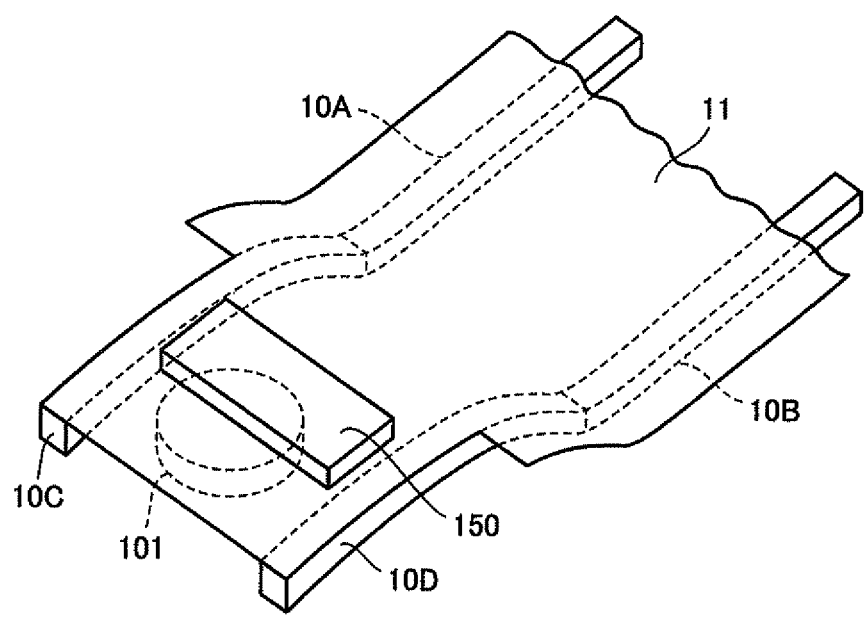
FIG. 10 is a perspective view showing a floor panel 11 and vehicle coil unit 101 of an electrical powered vehicle.

The inventors of the present application devised the mounting manner of vehicle self-resonant coil 110 and facility self-resonant coil 240 to suppress leakage of a magnetic field of high intensity around electrical powered vehicle 100. Details thereof will be described with reference to the drawings FIG. 8 is a perspective view showing the bottom face of electrical powered vehicle 100. FIG. 9 is a bottom view of electrical powered vehicle 100. FIG. 10 is a perspective view of a floor panel 11 and vehicle coil unit 101 of the electrical powered vehicle.

Referring to FIGS. 8-10, electrical powered vehicle 100 includes a pair of side members 10A and 10B arranged in the width direction of the vehicle, a pair of rear side members 10C and 10D arranged in the width direction of the vehicle, and a floor panel 11. Floor panel 11 is fixed to the top face of side members 10A and 10B and to the top face of rear side members 10C and 10D. Vehicle coil unit 101 is provided at the lower face of floor panel 11.

As shown in FIGS. 9 and 10, rear side member 10C is connected to the trailing end of side member 10A, whereas rear side member 10D is connected to the trailing end of side member 10B. Viewing vehicle coil unit 101 and rear side members 10C and 10D from above, vehicle coil unit 101 is arranged between rear side members 10C and 10D.

Figure 11:
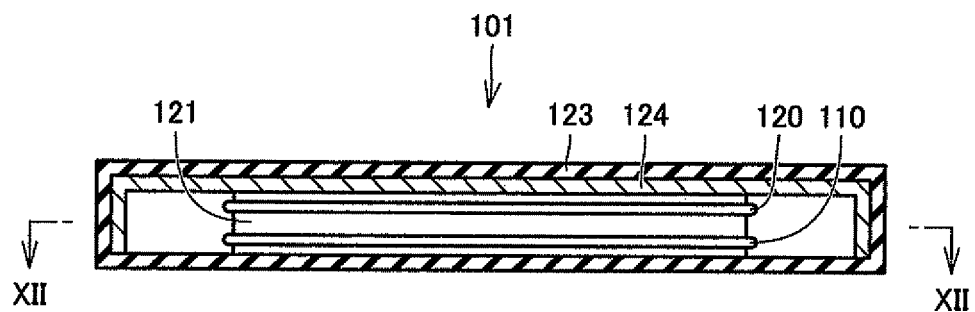
FIG. 11 is a side sectional view of vehicle coil unit 101.
Figure 12:
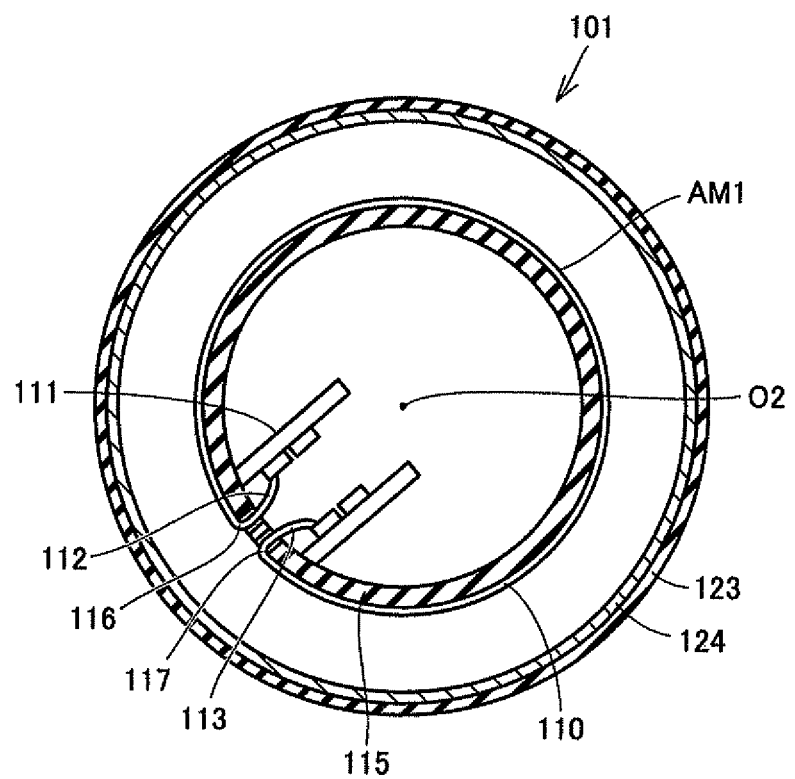
FIG. 12 is a sectional view taken along line XII-XII of FIG. 11.

FIG. 11 is a side sectional view of vehicle coil unit 101. FIG. 12 is a sectional view taken along line XII-XII of FIG. 11.

As shown in FIGS. 11 and 12, vehicle coil unit 101 includes a vehicle electromagnetic induction coil 120, a vehicle self-resonant coil 110 arranged beneath vehicle electromagnetic induction coil 120, a vehicle capacitor 111, a bobbin 121, a resin case 123, and a shield 124. Vehicle self-resonant coil 110 and vehicle electromagnetic induction coil 120 are attached around the outer circumferential face of bobbin 121. Vehicle capacitor 111 is arranged inside bobbin 121. Resin case 123 includes a top panel fixed to floor panel 11, a circumferential wall extending downwards from the perimeter edge of the top panel, and a bottom. At the inner surface of resin case 123, shield 124 is formed along the top panel and circumferential wall of resin case 123.

Accordingly, intrusion of the electromagnetic field developed around vehicle self-resonant coil 110 into the vehicle and leakage around the vehicle are suppressed.

Since the number of windings of vehicle self-resonant coil 110 is set to approximately 1 in the first embodiment, anti-node AM1 of vehicle self-resonant coil 110 is located at the side opposite to ends 116 and 117 of vehicle self-resonant coil 110 relative to winding center O2.

When the number of windings of vehicle self-resonant coil 110 is an odd number such as 1 winding or 3 windings, anti-node AM1 is located at the side opposite to ends 116 and 117 and vehicle capacitor 111 relative to winding center O2.

In FIG. 9, vehicle self-resonant coil 110 is arranged such that the distance between anti-node AM1 and the center point O4 of electrical powered vehicle 100 is shorter than the distance between winding center O2 and the center point O4. Regions R1 and R2 shown in FIG. 9 represent a region of high magnetic field intensity. Since anti-node AM1 is arranged at a location close to the center of electrical powered vehicle 100, leakage of high magnetic field from regions R1 and R2 developed around anti-node AM1 towards the surroundings of electrical powered vehicle 100 can be suppressed.

Anti-node AM1 is arranged at the middle along the width direction of electrical powered vehicle 100, allowing leakage of the magnetic field developed around anti-node AM1 from the side face of electrical powered vehicle 100 to be suppressed.

In the example of FIG. 9, anti-node AM1 is located on a center line O1 that passes through the middle along the width direction of electrical powered vehicle 100 and that extends in the longitudinal direction of electrical powered vehicle 100. However, anti-node AM1 is not limited to that position, and may be located on and around center line O1.

As shown in FIG. 10, vehicle coil unit 101 is arranged between rear side member 10C and rear side member 10D, which protrude from the lower face of floor panel 11. Rear side member 10C and rear side member 10D serve to prevent the magnetic field of high intensity from leaking outside.

Further, by arranging vehicle coil unit 101 between rear side members 10C and 10D, protection of vehicle coil unit 101 can be afforded even if electrical powered vehicle 100 receives side collision. It is particularly preferable to arrange vehicle self-resonant coil 110 to be located between the pair of rear wheels arranged in the width direction. The rear wheels serve to prevent the magnetic field developed around anti-node AM1 from leaking towards the surrounding of the vehicle and to protect vehicle coil unit 101 from external collision.

Since battery 150 is arranged between rear side members 10C and 10D at floor panel 11, the distance of the wiring between vehicle coil unit 101 and battery 150 can be shortened.

Figure 13:
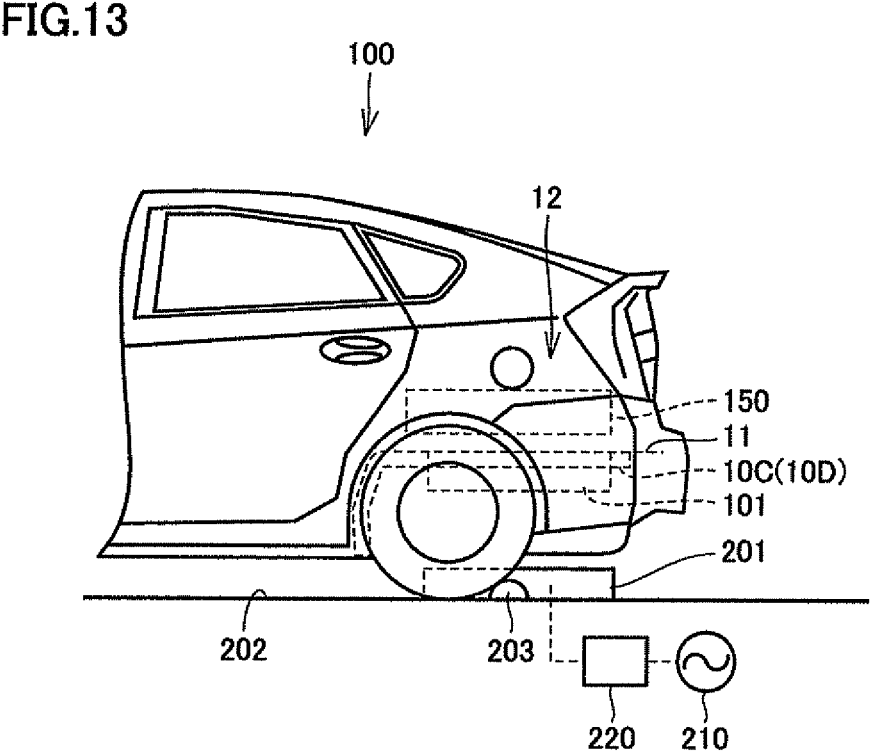
FIG. 13 is a partial side view of electrical powered vehicle 100 parked at a predetermined position in a parking space 202.

Next, facility coil unit 201 of external power feeding apparatus 200 will be described in detail hereinafter. FIG. 13 is a partial side view of electrical powered vehicle 100 parked at a predetermined position in parking space 202.

As shown in FIG. 13, a wheel block 203 for stopping the rear wheel of electrical powered vehicle 100 is provided. By stopping electrical powered vehicle 100 such that the rear wheel abuts against wheel block 203, electrical powered vehicle 100 is parked at the predetermined position in parking space 202.

When electrical powered vehicle 100 parks at the predetermined position in parking space 202, facility coil unit 201 is located facing vehicle coil unit 101 in the vertical direction.

Figure 14:
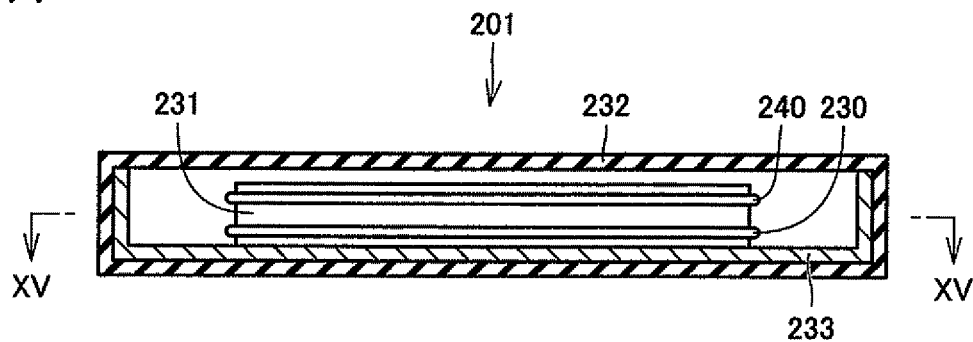
FIG. 14 is a sectional view of a facility coil unit 201.
Figure 15:
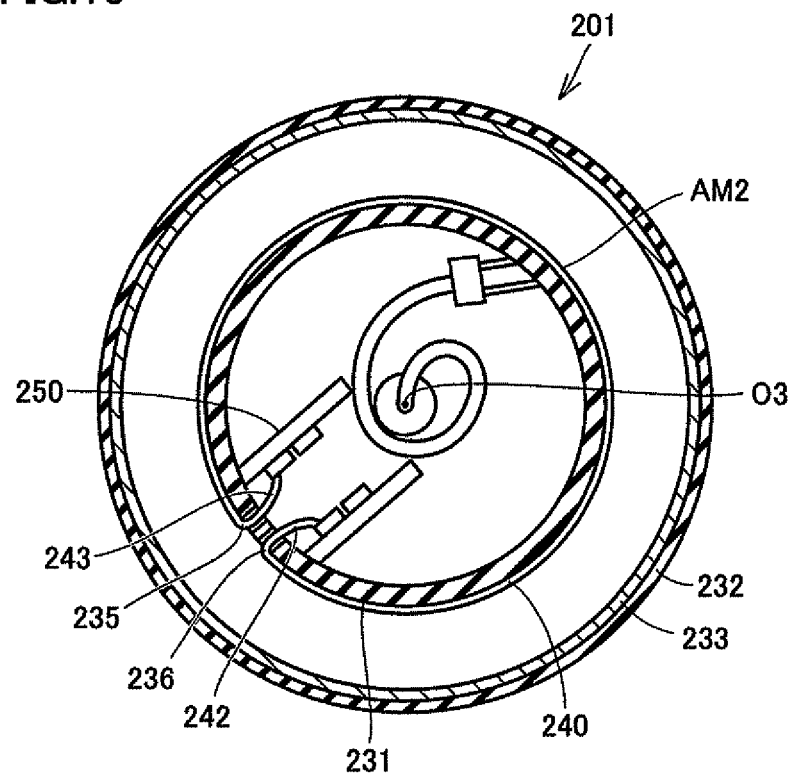
FIG. 15 is a sectional view taken along line XV-XV of FIG. 14.

FIG. 14 is a sectional view of facility coil unit 201. FIG. 15 is a sectional view taken along line XV-XV of FIG. 14.

As shown in FIGS. 14 and 15, facility coil unit 201 includes a facility self-resonant coil 240, a facility electromagnetic induction coil 230 arranged below facility self-resonant coil 240, a bobbin 231, a resin case 232, and a shield 233.

Facility self-resonant coil 240 and facility electromagnetic induction coil 230 are attached along the outer circumferential face of bobbin 231. Facility capacitor 250 is arranged inside bobbin 231.

Resin case 232 includes a top panel, a bottom, and a circumferential wall. At the inner surface of resin case 232, shield 233 is formed along the bottom and circumferential wall. Anti-node AM2 is located at the side opposite to the ends of facility self-resonant coil 240 and facility capacitor 250, relative to a winding center O3.

When electrical powered vehicle 100 is located at a predetermined position in parking space 202, vehicle self-resonant coil 110 and facility self-resonant coil 240 are aligned in the vertical direction.

As shown in FIG. 4, anti-node AM1 of vehicle self-resonant coil 110 and anti-node AM2 of facility self-resonant coil 240 are aligned in the vertical direction (height direction).

By arranging anti-node AM2 below anti-node AM1, anti-node AM2 is located closer to center point O4 of electrical powered vehicle 100 shown in FIG. 9 than winding center O3. Accordingly, the magnetic field of high intensity developed around anti-node AM2 can be prevented from leaking from the area between the vehicle and the ground. Furthermore, the facing of anti-node AM1 with respect to anti-node AM2 allows the power transmission efficiency between vehicle self-resonant coil 110 and facility self-resonant coil 240 to be improved.

Second Embodiment

An electrical powered vehicle 100 and external power feeding apparatus 200 according to a second embodiment will be described with reference to FIGS. 16 and 17. In the context of the configuration shown in FIGS. 16 and 17, elements identical to or corresponding to those in the configuration of FIGS. 1-15 have the same reference characters allotted, and description thereof will not be repeated.

Figure 16:
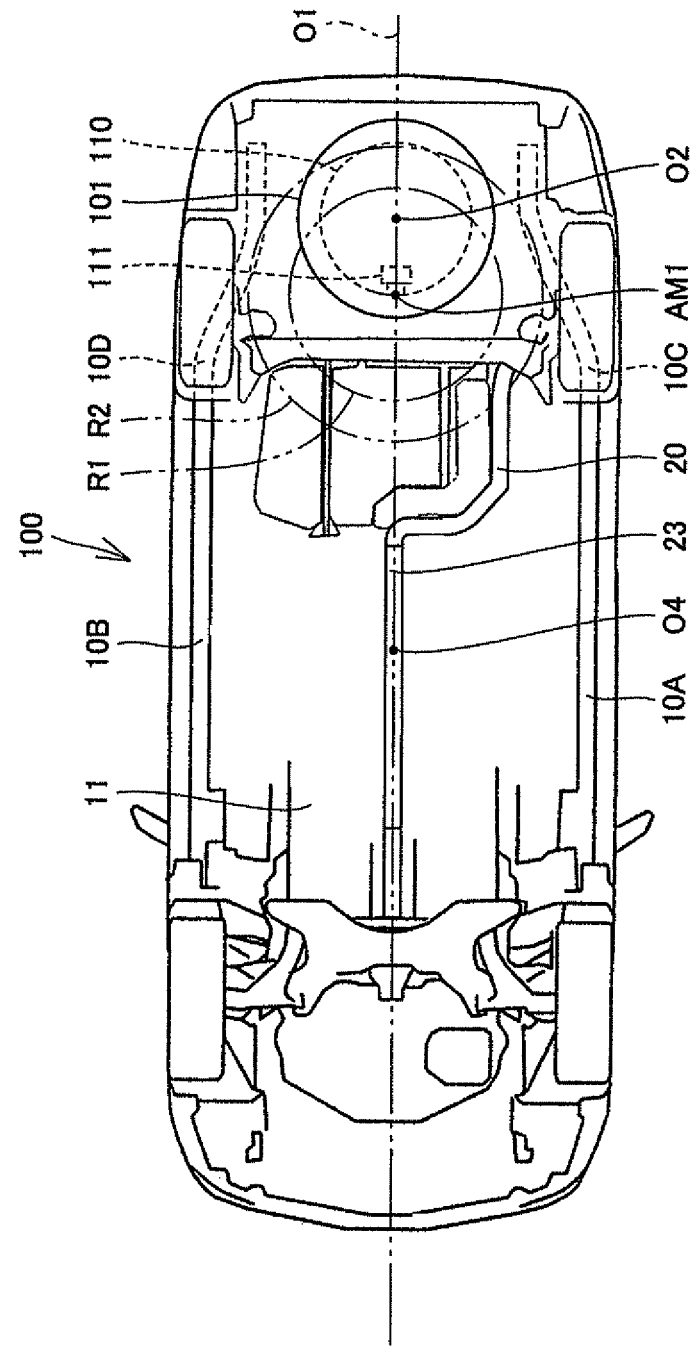
FIG. 16 is a bottom view of electrical powered vehicle 100 according to a second embodiment.

FIG. 16 is a bottom view of electrical powered vehicle 100 according to the second embodiment. As shown in FIG. 16, electrical powered vehicle 100 of the second embodiment has anti-node AM1 of vehicle self-resonant coil 110 in vehicle coil unit 101 located closer to center point O4 than winding center O2. The distance between anti-node AM1 and center point O4 is shorter than the distance between winding center O2 and center point O4.

In the second embodiment, vehicle capacitor 111 is arranged to be located closer to center point O4 of electrical powered vehicle 100 than winding center O2.

Figure 17:
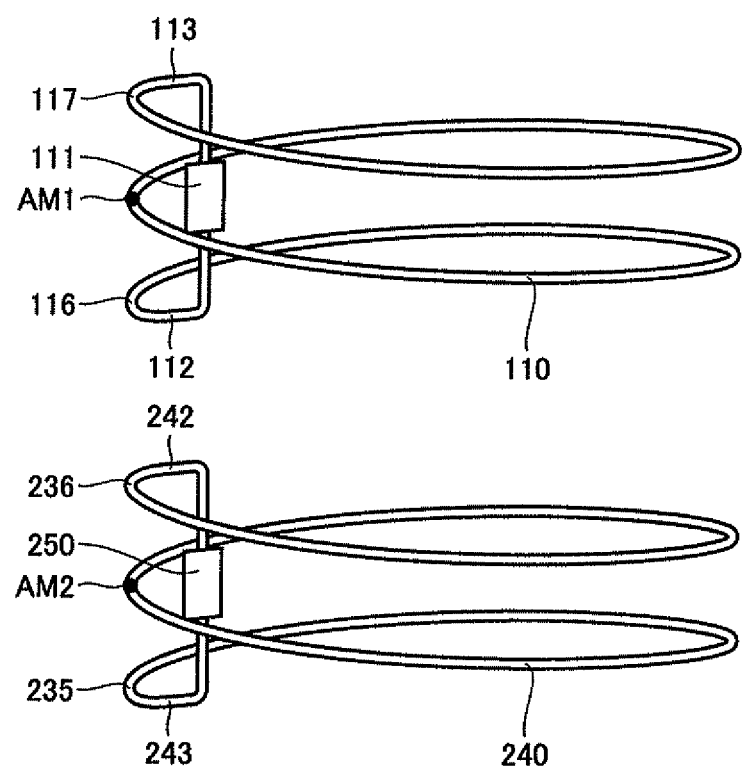
FIG. 17 is a perspective view schematically showing vehicle self-resonant coil 110 and facility self-resonant coil 240 when electrical powered vehicle 100 is parked at a predetermined position in parking space 202.

FIG. 17 is a perspective view schematically representing vehicle self-resonant coil 110 and facility self-resonant coil 240 when electrical powered vehicle 100 is parked at the predetermined position in parking space 202.

As shown in FIG. 17, the number of windings of vehicle self-resonant coil 110 and facility self-resonant coil 240 is 2 in the second embodiment.

Therefore, ends 116 and 117 of vehicle self-resonant coil 110 and anti-node AM1 are aligned in a row. Similarly, at facility self-resonant coil 240, ends 236 and 235 and anti-node AM2 of facility self-resonant coil 240 are aligned along one direction. When the number of windings of vehicle self-resonant coil 110 and facility self-resonant coil 240 is an even number such as 2 or 4, the anti-node of each coil, the coil ends, and the capacitor are all located at the side of center point O4 relative to the winding center. Furthermore, each coil end, anti-node, and coil are aligned along a direction parallel to the center line of the coil.

When electrical powered vehicle 100 parks at the predetermined position and electromagnetic field resonant coupling is established between vehicle self-resonant coil 110 and facility self-resonant coil 240, anti-node AM1 and anti-node AM2 are aligned in the vertical direction.

Therefore, the magnetic field of high intensity developed around anti-node AM2 can be prevented from leaking around electrical powered vehicle 100.

It should be understood that the embodiments disclosed herein are illustrative and non-restrictive in every respect. The scope of the present invention is defined by the terms of the claims, and is intended to include any modifications within the scope and meaning equivalent to the terms of the claims.

INDUSTRIAL APPLICABILITY

The present invention is applicable to a vehicle and an external power feeding apparatus.

REFERENCE SIGNS LIST

10A, 110B side member; 10C, 10D rear side member; 11 floor panel; 100 electrical powered vehicle; 101 vehicle coil unit; 110 vehicle self-resonant coil; 111 vehicle capacitor; 112, 113, 242, 243 connection wiring; 114, 114 electrode; 116, 117, 235, 236 end; 120 vehicle electromagnetic induction coil; 121, 231 bobbin; 123, 232 resin case; 124, 233 shield; 130 rectifier; 140 converter; 150 battery; 160 power control unit; 170 motor unit; 200 external power feeding apparatus; 201 facility coil unit; 202 parking space; 203 wheel block; 210 AC source; 220 high frequency power driver; 230 facility electromagnetic induction coil; 240 facility self-resonant coil; 250 facility capacitor; 310 high frequency power source; 320 primary coil; 330 primary self-resonant coil; 340 secondary self-resonant coil; 350 secondary coil; 360 load; AM1, AM2 anti-node; CL1-CL7, k1, k2, k3 curve; LE circuit end; LM1 middle position; LO circuit origin; O1 center line; O2, O3 winding center; O4 center point; R1, R2 region.

The invention claimed is:

1. A vehicle comprising:
a vehicle self-resonant coil establishing electromagnetic field resonant coupling with a facility self-resonant coil provided external to the vehicle, allowing reception of electric power from said facility self-resonant coil; and
a capacitor connected at both ends of said vehicle self-resonant coil,
a resonant circuit being formed by said vehicle self-resonant coil and said capacitor,
said vehicle self-resonant coil being formed to extend along a circumference of a winding center, centered about the winding center, the number of windings of said vehicle self-resonant coil being an odd number,
a distance between the center of said vehicle and an anti-node of said vehicle self-resonant coil being shorter than the distance between said winding center and the center of said vehicle, the anti-node of said vehicle self-resonant coil being an area of an anti-node of AC current flowing through said vehicle self-resonant coil when electromagnetic field resonant coupling is established between said vehicle self-resonant coil and said facility self-resonant coil,
said anti-node being located at a middle of a current path of said resonant circuit,
said capacitor being arranged at a side opposite to said anti-node relative to said winding center.

2. The vehicle according to claim 1, further comprising a capacitor connected to said vehicle self-resonant coil, wherein
a resonant circuit is formed by said vehicle self-resonant coil and said capacitor,
said anti-node is located at a middle of a current path of said resonant circuit.

3. The vehicle according to claim 1,
further comprising a pair of rear side members aligned in a width direction of said vehicle,
wherein when viewing said rear side members and said vehicle self-resonant coil from above, said vehicle self-resonant coil is arranged between said rear side members.

4. An external power feeding apparatus provided at a parking space where said vehicle according to claim 3 parks at a predetermined position, said external power feeding apparatus comprising:
a facility self-resonant coil establishing electromagnetic field resonant coupling with said vehicle self-resonant coil to transmit electric power to said vehicle self-resonant coil,
when said vehicle parks at said predetermined position, the anti-node of said vehicle self-resonant coil and an anti-node of said facility self-resonant coil being aligned in a height direction, the anti-node of said facility self-resonant coil being an area of an anti-node of AC current flowing through said facility self-resonant coil when electromagnetic field resonant coupling is established between said vehicle self-resonant coil and said facility self-resonant coil.

5. The vehicle according to claim 1, wherein said anti-node is arranged at a central region along a width direction of said vehicle.

6. An external power feeding apparatus provided at a parking space where said vehicle according to claim 1 parks at a predetermined position, said external power feeding apparatus comprising:
a facility self-resonant coil establishing electromagnetic field resonant coupling with said vehicle self-resonant coil to transmit electric power to said vehicle self-resonant coil,
when said vehicle parks at said predetermined position, the anti-node of said vehicle self-resonant coil and an anti-node of said facility self-resonant coil being aligned in a height direction, the anti-node of said facility self-resonant coil being an area of an anti-node of AC current flowing through said facility self-resonant coil when electromagnetic field resonant coupling is established between said vehicle self-resonant coil and said facility self-resonant coil.

7. A vehicle comprising:
a vehicle self-resonant coil establishing electromagnetic field resonant coupling with a facility self-resonant coil provided external to the vehicle, allowing reception of electric power from said facility self-resonant coil; and
a capacitor connected at both ends of said vehicle self-resonant coil,
a resonant circuit being formed by said vehicle self-resonant coil and said capacitor, said vehicle self-resonant coil being formed to extend along a circumference of a winding center, centered about the winding center, the number of windings of said vehicle self-resonant coil being an even number, a distance between the center of said vehicle and an anti-node of said vehicle self-resonant coil being shorter than the distance between said winding center and the center of said vehicle, the anti-node of said vehicle self-resonant coil being an area of an anti-node of AC current flowing through said vehicle self-resonant coil when electromagnetic field resonant coupling is established between said vehicle self-resonant coil and said facility self-resonant coil, said anti-node being located at a middle of a current path of said resonant circuit, the distance between said capacitor and the center of said vehicle being shorter than the distance between said winding center and the center of said vehicle.

8. An external power feeding apparatus provided at a parking space where said vehicle according to claim 7 parks at a predetermined position, said external power feeding apparatus comprising:

a facility self-resonant coil establishing electromagnetic field resonant coupling with said vehicle self-resonant coil to transmit electric power to said vehicle self-resonant coil, when said vehicle parks at said predetermined position, the anti-node of said vehicle self-resonant coil and an anti-node of said facility self-resonant coil being aligned in a height direction, the anti-node of said facility self-resonant coil being an area of an anti-node of AC current flowing through said facility self-resonant coil when electromagnetic field resonant coupling is established between said vehicle self-resonant coil and said facility self-resonant coil.

* * * * *